United States Patent [19]

Willens

[11] 4,000,492
[45] Dec. 28, 1976

[54] METAL FILM RECORDING MEDIA FOR LASER WRITING
[75] Inventor: Ronald Howard Willens, Warren, N.J.
[73] Assignee: Bell Telephone Laboratories, Incorporated, Murray Hill, N.J.
[22] Filed: Apr. 4, 1974
[21] Appl. No.: 457,980
[52] U.S. Cl. ................................ 346/1; 346/76 L; 346/135; 427/53; 428/457
[51] Int. Cl.² ..................................... G01D 15/34
[58] Field of Search ................. 346/135, 76 L, 1; 117/8, 211, 217, 218; 427/53; 428/411, 457

[56] References Cited
UNITED STATES PATENTS

| 3,560,994 | 2/1971 | Wolff et al. | 346/135 |
| 3,665,483 | 5/1972 | Becker et al. | 346/135 X |
| 3,720,784 | 3/1973 | Maydan et al. | 346/76 L X |
| 3,843,401 | 10/1974 | Carroll | 117/227 |

OTHER PUBLICATIONS
Weast, R. C.; Handbook of Chemistry and Physics; 53rd Ed. Chemical Rubber Co., Cleveland Ohio, 1972–1973 pp. E–205, E–206.

Primary Examiner—Joseph W. Hartary
Attorney, Agent, or Firm—George S. Indig; Peter V. D. Wilde

[57] ABSTRACT

Thin metal film systems supported on transparent substrates are described for use in laser micromachining of high resolution facsimile images. The disclosed systems, which include a specific anti-reflection film, require less energy for micromachining than bismuth films of equal optical opacity.

13 Claims, 5 Drawing Figures

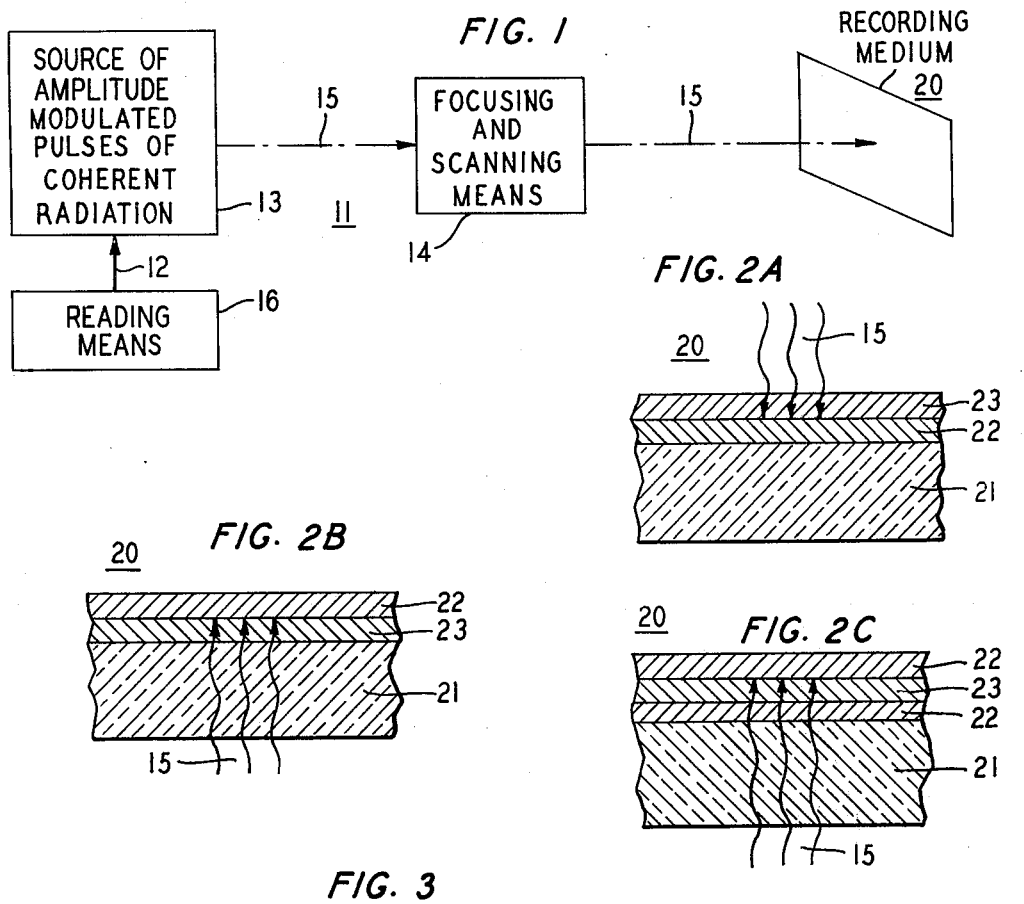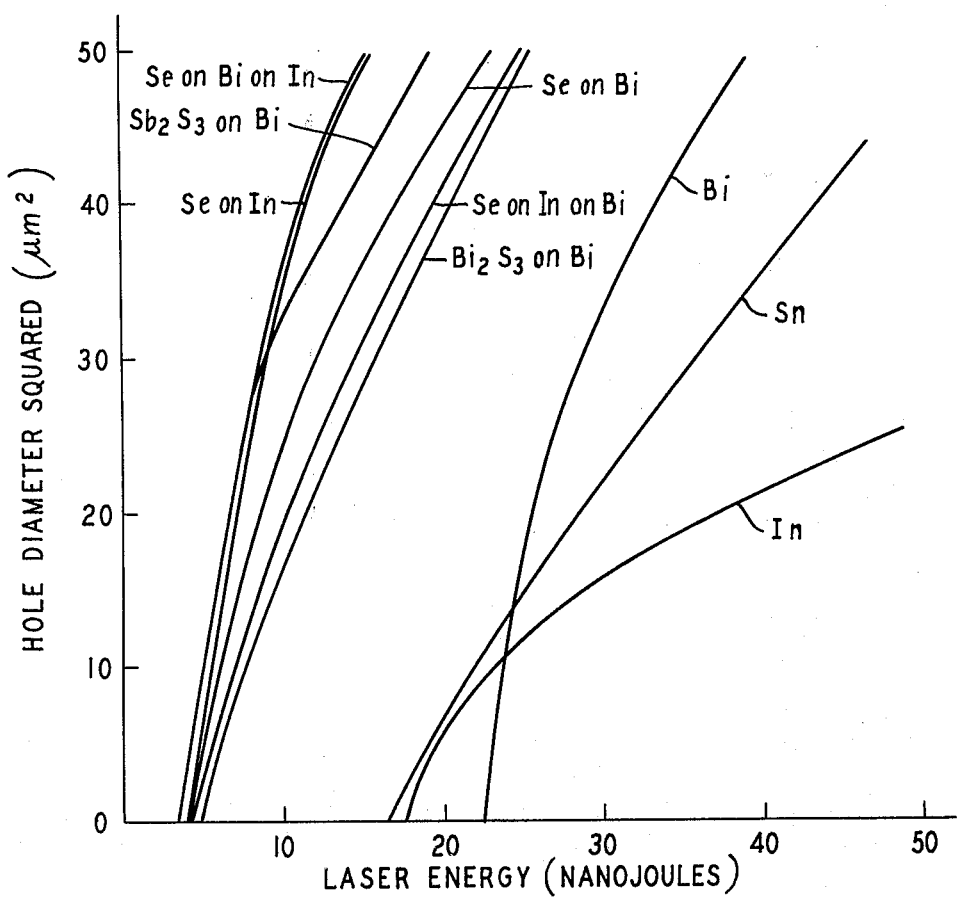

METAL FILM RECORDING MEDIA FOR LASER WRITING

BACKGROUND OF THE INVENTION

1. Field of the Invention

The invention relates to a recording system, and, in particular, to one in which information is recorded with a laser in a radiation absorbing film.

2. Description of the Prior Art

Improvements in apparatus for recording information have been described by D. Maydan, M. I. Cohen, and R. E. Kerwin in U.S. Pat. No. 3,720,784, issued Mar. 13, 1973. In that patent is described apparatus capable of forming a large number of short duration amplitude-modulated pulses of spatially coherent radiation to create positive or negative pictorial images. The images consist of a pattern of small discrete holes in a thin radiation absorbing film. In one typical mode of operation, the short laser pulses evaporate a small amount of the film in the center of the spot upon which the beam is incident and melt a large area around this region. Surface tension then draws the melted material toward the rim of the melted area, thereby displacing the film from a nearly circular region of the transparent substrate. By varying the amplitude of the very short laser pulses, the diameter of the region that is melted can be varied, and the area of the increasing hole increases monotonically with increasing pulse amplitude. The holes are formed in parallel rows with the centers of the holes equally spaced along each row and from row to row. The laregest holes are of diameter nearly equal to the center-to-center spacing of the holes. In this way, it is possible to achieve a wide range of shades of grey. The apparatus is particularly useful for recording graphic copy or images that are transmitted over telephone lines, such as from facsimile transmitters.

In that patent, the preferred radiation absorbing film comprises a thin layer of bismuth (e.g., about 500 Angstroms) deposited on a polyester substrate such as Mylar (trademark of E. I. Dupont de Nemours and Co., Inc.). In U.S. Pat. No. 3,560,994, issued Feb. 2, 1971 to K. Wolff and H. Hamisch, it is taught that the properties of bismuth films are improved by superimposing a coating which decreases the reflectivity of the incident laser beam. Specifically, that patent teaches that such an anti-reflection film must have an index of refraction $n$ of about 4, and, accordingly, silicon ($n = 4.5$) or germanium ($n = 4.4$) are preferred.

SUMMARY OF THE INVENTION

In accordance with the invention, film systems which include an anti-reflection film require less energy to micromachine than bismuth or bismuth/germanium films of equal optical opacity. The film systems include bi-layer films of bismuth/bismuth sulfide, bismuth/antimony trisulfide, bismuth/selenium, indium/selenium, tin/selenium, and tri-layer films of indium/bismuth/selenium and bismuth/selenium/bismuth.

BRIEF DESCRIPTION OF THE DRAWING

FIG. 1 depicts in block form illustrative apparatus used to record information on a metal film by laser writing;

FIGS. 2A, 2B, and 2C are fragmentary cross-sectional views depicting alternate methods of recording information on a metal film supported on a substrate; and FIG. 3 illustrates, on coordinates of hole diameter squared (in $\mu m^2$) and laser energy (in $nJ$), the energy required for laser micromachining holes in various metal film recording media.

DETAILED DESCRIPTION OF THE INVENTION

Apparatus 11 used for laser micromachining of thin metal films is schematically represented in FIG. 1. The apparatus comprises a source 13 of optical pulses of spatially coherent radiation, which are amplitude-modulated in accordance with a received signal 12, and focusing and scanning means 14 for writing on a recording medium 20 with these optical pulses. Source 13 of optical pulses illustratively includes an intracavity modulator, such as that described by D. Maydan in U.S. Pat. No. 3,703,687, issued Nov. 21, 1972. Also shown in FIG. 1 is reading means 16, which may or may not be associated in close proximity with the foregoing components.

Reading means 16 provides a facsimile signal by scanning an object whose image is to be recorded on recording medium 20. Typical objects are a picture, an X-ray, a chart, a plot, a page of writing, a page of a book, a micro-film image, a portion of newspaper print and a three-dimensional object. By illuminating the object or portions of the object and by detecting the relative intensity of the light reflected or scattered from the object in a time sequential manner, it is possible to "read" and form a facsimile signal representative of the object. An example of such reading means 16, or facsimile transmission apparatus, is disclosed in a patent application by H. A. Watson, entitled "Compact Flatbed Page Scanner", Ser. No. 445,051, filed Feb. 25, 1974.

To write an image of the scanned object on recording medium 20, an electrical signal representative of the image is transformed into beam 15 of amplitude-modulated pulses of coherent optical radiation which are short in duration compared with the time interval between pulses. Beam 15 is then focused onto the film and scanned across it by focusing and scanning means 14.

As shown in FIGS. 2A, 2B, and 2C, the recording medium 20 comprises a radiation absorbing film, or metal film, 22 on a transparent substrate 21. Each focused pulse of coherent radiation heats up a very small discrete region of the film. If the temperature for any part of the region on which the laser pulse is incident reaches the boiling point of the film or if a sufficiently large area is melted, a hole or crater is formed in the film. The size of the hole that is formed increases monotonically with increasing energy density of the laser pulse. The holes are located in parallel rows with the centers of the holes equally spaced along each row and from row to row. The largest holes are of diameter nearly equal to the center-to-center spacing of the holes. As a consequence, such films may, under the proper conditions, yield a useful grey scale in the image recorded.

The Maydan et al. U.S. Pat. No. 3,720,784 describes a preferred recording medium comprising a thin radiation absorbing film of bismuth supported on a transparent polyester substrate. In accordance with the present invention, a reduction in laser energy required to machine holes is obtained by forming a second film, or anti-reflection layer, 23 between the radiation absorbing film 22 and the incident radiation 15. The purpose of the anti-reflection layer is to substantially increase the amount of energy absorbed from incident laser radiation without adding to the total energy required to record information to a greater extent than is realized by the increased absorption of laser radiation. However, contrary to the teaching of Wolff et al., U.S. Pat. No. 3,560,994, the anti-reflection layer 23 need not have an index of refraction $n$ of approximately 4. Rather, three substances, namely bismuth trisulfide ($n = 1.3$ to $1.5$), antimony trisulfide ($n = 3.2$), and selenium ($n = 2.5$), exhibit the desired properties and accordingly are preferred. Preferable radiation absorbing films used in combination with the anti-reflection film are bismuth, indium, a combination of indium/bismuth, and tin. An advantage of employing a selenium anti-reflection film and a bismuth radiation absorbing film is that unlike other recording media which tend to lighten with age, bismuth/selenium films tend to darken with age, thus having a longer useful life. For front machining, as shown in FIG. 2A, radiation absorbing film 22 is formed on substrate 21, with the anti-reflection film 23 formed on the radiation absorbing film. For back machining, as shown in FIG. 2B, the anti-reflection film is interposed between the substrate and the radiation absorbing film. In some applications involving back machining a bismuth radiation absorbing film formed on a selenium anti-reflection film, it is desireable to form a very thin bismuth layer, ranging from about 50 Angstroms to 100 Angstroms, between the substrate and the selenium film, as shown in FIG. 2C. This arrangement prevents wetting of the substrate by the selenium film, which otherwise might reduce the effectiveness of the selenium film.

Deposition of the metal films is conveniently performed by well-known vacuum evaporation procedures. Deposition of the sulfides can be performed by flash-evaporation of the corresponding compound. The range in film thickness depends first on the necessity of forming a film thick enough to be continuous and opaque, with an optical density of about 1 to 3, and second on the need to form a film thin enough to laser machine at as low an energy as possible. Consistent with this, the thicknesses of the films may, in general, range from about 100 Angstroms to 1000 Angstroms.

A plot of hole diameter squared produced in a radiation absorbing film as a function of applied laser energy from a laser having a beam diameter of 8 $\mu$m, a pulse duration of 30 nsec, and operating at a wavelength of 1.06 $\mu$m is shown in FIG. 3. There, the improved characteristics of using the specified anti-reflection layers in accordance with the invention may be seen. In all cases, the substrate is a flexible polyester film, here Celanar (trademark of Celanese Corporation). All curves illustrate results obtained by front machining. A bismuth radiation absorbing film without an anti-reflection coating is included for comparision.

The Table below lists measurements obtained by laser micromachining of several examples of metal film recording media. The recording media examples are identified in terms of the component in each layer and the layer thickness in Angstroms, with the final component listed being formed on the substrate. Listed in the Table is the threshold pulse machining energy required for a laser beam of diameter 8 micrometers and pulse duration of 30 nanoseconds from a neodymium-doped yttrium aluminum garnet laser. Also listed is the pulse energy needed to machine a hole 6 micrometers in diameter and the optical transmission through the film at 6328 Angstroms. The recording media examples are listed in the table in order of increasing threshold machining energy. It can be seen that the metal film recording media in accordance with the invention require less energy to micromachine. For comparison, also listed are bismuth films without an anti-reflection coating, such as disclosed by Maydan et al. in U.S. Pat. No. 3,720,784, and bismuth films with a germanium anti-reflection coating, such as disclosed by Wolff et al. in U.S. Pat. No. 3,560,994.

TABLE

LASER MICROMACHINING OF METAL FILM RECORDING MEDIA

| System | Front/Back Machining | Threshold Energy, nJ | Energy Required to Machine a 6-$\mu$m Hole, nJ | % Transmission |
|---|---|---|---|---|
| 750 Se/400 Bi/200 In | F | 3.1 | 10.5 | 1.1 |
| 900 Sb$_2$S$_3$/500 Bi | F | 3.5 | 12 | 1.2 |
| 750 Se/500 In | F | 4.3 | 11 | 0.4 |
| 710 Se/790 In/200 Bi | F | 4.8 | 18 | 1–1.6 |
| 600 Bi$_2$S$_3$/600 Bi | F | 5.2 | 19.4 | 0.18 |
| 400 Bi/800 Se | B | 5.2 | 16 | 1.8 |
| 600 Se/Sn | F | 5.7 | — | 0.5 |
| 800 Se/600 Bi | F | 5.7 | 19.5 | 0.22 |
| 500 Bi/750 Se/100 Bi | B | 6.2 | 19.5 | 0.3 |
| 450 GE/500 Bi/100 In | F | 7.1 | 25 | 0.4 |
| 550 Ge/750 Bi | F | 12.5 | 30 | 0.16 |
| Bi | F | 23 | 31 | 1 |
| 422 Sn | F | 17 | 42 | 2.1 |
| 450 In | F | 20 | 65 | 2.6 |

What is claimed is:

1. A method for recording information in a metal film recording medium by selectively removing portions of a thin radiation absorbing film supported on a flexible transparent substrate, the method comprising exposing the radiation absorbing film to modulated coherent radiation of sufficient power and duration to remove the portions, the film comprising a first layer of at least one metal selected from the group consisting of bismuth, indium, and tin and a second layer directy exposed to said modulated coherent radiation prior to said first layer, CHARACTERIZED IN THAT the material of said second layer has a refractive index substantially less than 4.0 and is selected from the group consisting of bismuth trisulfide, antimony trisulfide, and selenium.

2. A metal film recording medium for recording information by exposure of the medium to a laser beam, the medium consisting essentially of a flexible transparent substrate and a radiation absorbing film formed on the substrate, the film comprising a first layer of at least one metal selected from the group consisting of bismuth, indium and tin and a second layer exposed to said laser beam prior to said first layer, characterized in that the material of said second layer has a refractive index substantially less than 4.0 and is selected from the group consisting of bismuth trisulfide, antimony trisulfide, and selenium.

3. The medium of claim 2 in which the first layer is formed on the substrate and the second layer is formed on the first layer, the laser beam being incident on the second layer.

4. The medium of claim 2 in which the second layer is formed on the substrate and the first layer is formed on the second layer, the laser beam being incident on the substrate.

5. The medium of claim 4 in which the second layer is selenium and the first layer is bismuth, and in which a thin layer of bismuth ranging from 50 Angstroms to 100 Angstroms in thickness is interposed between the substrate and the selenium layer.

6. The medium of claim 2 in which the film comprises a first layer of bismuth and a second layer of bismuth trisulfide, antimony trisulfide, or selenium.

7. The medium of claim 6 in which the second layer is selenium.

8. The medium of claim 2 in which the film comprises a first layer of indium and a second layer of bismuth trisulfide, antimony trisulfide, or selenium.

9. The medium of claim 8 in which the second layer is selenium.

10. The medium of claim 2 in which the first layer comprises a layer of indium and a layer of bismuth and the second layer comprises a layer of selenium.

11. The medium of claim 2 in which the first layer comprises a layer of tin and the second layer comprises a layer of bismuth trisulfide, antimony trisulfide, or selenium.

12. The medium of claim 2 in which each layer ranges from 100 Angstroms to 1000 Angstroms in thickness.

13. The medium of claim 2 in which the transparent substrate is a polyester film.

* * * * *